(12) United States Patent
Finocchiaro et al.

(10) Patent No.: US 9,534,799 B2
(45) Date of Patent: Jan. 3, 2017

(54) DEVICE AND METHOD FOR AIR CONDITIONING

(71) Applicant: Pietro Finocchiaro, S. Agata Li Battiata (IT)

(72) Inventors: Pietro Finocchiaro, S. Agata Li Battiata (IT); Marco Beccali, Palermo (IT)

( * ) Notice: Subject to any disclaimer, the term of this patent is extended or adjusted under 35 U.S.C. 154(b) by 105 days.

(21) Appl. No.: 14/426,958

(22) PCT Filed: Sep. 5, 2013

(86) PCT No.: PCT/IB2013/058322
§ 371 (c)(1),
(2) Date: Mar. 9, 2015

(87) PCT Pub. No.: WO2014/041467
PCT Pub. Date: Mar. 20, 2014

(65) Prior Publication Data
US 2015/0233590 A1 Aug. 20, 2015

(30) Foreign Application Priority Data
Sep. 11, 2012 (IT) .............................. CT2012A0013

(51) Int. Cl.
*F24F 3/14* (2006.01)
*F24F 5/00* (2006.01)

(52) U.S. Cl.
CPC ........... *F24F 3/1429* (2013.01); *F24F 5/0046* (2013.01); *F24F 2005/0064* (2013.01)

(58) Field of Classification Search
CPC . F24F 3/1429; F24F 5/0046; F24F 2005/0064
See application file for complete search history.

(56) References Cited

U.S. PATENT DOCUMENTS

| | | | |
|---|---|---|---|
| 4,205,529 A * | 6/1980 | Ko | F24F 3/1417 62/235.1 |
| 4,488,408 A * | 12/1984 | Kajitsuka | F24F 3/1423 62/113 |
| 5,860,284 A | 1/1999 | Goland et al. | |
| 6,018,953 A | 2/2000 | Belding et al. | |

(Continued)

FOREIGN PATENT DOCUMENTS

| | | |
|---|---|---|
| GB | 2117107 A | 10/1983 |
| JP | 2000304448 A | 11/2000 |

*Primary Examiner* — Emmanuel Duke
(74) *Attorney, Agent, or Firm* — Themis Law

(57) ABSTRACT

A device for air conditioning a casing housing a first conduit taking a first air flow rate from outside, a second conduit taking a second air flow rate from the premise to be conditioned and in fluidic communication with the first conduit for mixing the respective flow rates, an adsorption unit operatively connected with the first conduit upstream of the second conduit for dehumidifying the first air flow rate, the first and second conduits having a common delivery section delivering a third air flow rate to the premise to be conditioned, a heating system delivering a fourth air flow rate to the adsorption unit at a higher temperature than outside for the regeneration thereof. The adsorption unit includes first and second portions adapted to be selectively and alternately crossed by the first and the fourth air flow rates. An air conditioning method using the above device is also disclosed.

10 Claims, 3 Drawing Sheets

(56) References Cited

U.S. PATENT DOCUMENTS 7,938,888 B2 * 5/2011 Assaf ............... F24F 3/1417
 95/179
2010/0275775 A1 11/2010 Griffiths et al.

* cited by examiner

DEVICE AND METHOD FOR AIR CONDITIONING

TECHNICAL FIELD

The present invention is generally suitable for the technical field of the system for air treatment and relates with an air conditioning device powered by solar energy adapted to be used for cooling, heating and/or dehumidification of premises.

The invention also relates with a method for air conditioning adapted to be carried out with said device.

STATE OF THE ART

The most common devices for air conditioning adapted to be used within premises of relatively small sizes, such as building rooms, commonly referred to as "split", comprise a first unit adapted to be installed inside the premise to be conditioned and to be connected to a second unit placed outside the premise, generally in an open environment, to allow the heat exchange with the outside air.

Generally, this kind of air conditioners are exclusively powered by electrical energy and operate according to a refrigeration cycle with vapor compression in order to deliver dehumidified and cooled air within the premise to be conditioned, possibly by carrying out a filtration of the incoming air which is, however, somewhat limited.

In the context of drying air-conditioning systems, commonly known as Desiccant Evaporative Cooling (DEC), there are more complex devices which involve the use of adsorbent rotary heat exchangers by which it is possible to activate an open-type cooling cycle obtaining as a result the dehumidification and cooling of process air.

To this end, it is required the simultaneous availability of heat for the regeneration of the adsorbent material. In the DEC treatment unit powered by solar energy, this energy is partly stored in suitable storage systems, normally water-based, which allow to extend for a certain time the operation of the device even in times of low solar radiation.

As known, the drawbacks of the DEC cooling devices powered by solar energy are due to the overall dimensions, to the greater plant complication and to the high cost compared to traditional vapor compression systems. These reasons preclude their use in contexts such as those of civilian buildings.

SCOPE OF THE INVENTION

The present invention would provide an air conditioning device having high performances, compactness, operation autonomy and very limited power consumption.

In particular, the present invention has as object to provide an air conditioning device powered by solar energy that allows changing, cooling and dehumidifying the air inside the premise to serve. Further object of the device is to filter the air taken from the outside.

Still another object is to provide an air conditioning device which has high dehumidifying capability when compared with the air conditioners of known type for civil uses.

Still another object is to provide an air conditioning device which can be installed in a simple, rapid and possibly modular manner.

A further object is to provide an air conditioning method adapted to be carried out with the above device.

The above objects are obtained by an air conditioning device according to claim 1 and by a method for air conditioning according to claim 9.

This combination of features will allow to have adsorbents means with higher dehumidifying capacity and which allow to realize a device having a greater operation autonomy.

BRIEF DESCRIPTION OF THE DRAWINGS

The present invention and further advantages thereof will become more apparent in light of a detailed description of some preferred but not limiting embodiments of an air conditioning device according to the present invention shown in the annexed drawings, wherein.

BEST MODES OF CARRYING OUT THE INVENTION

Figure 1:
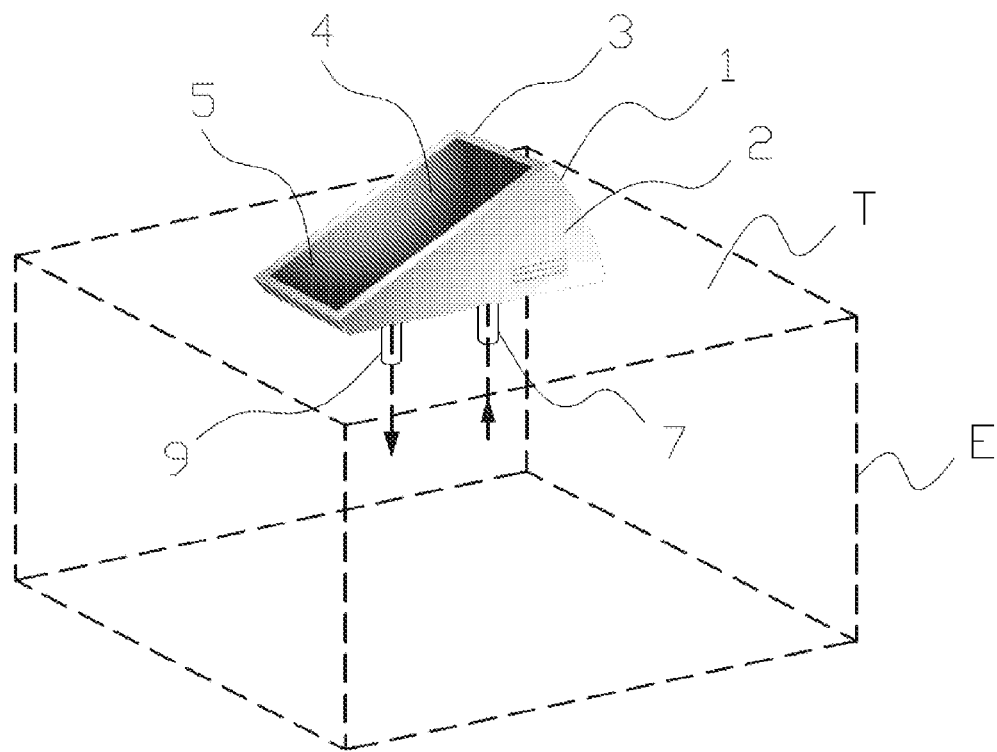
FIG. 1 is a perspective view of the device of the invention according a first embodiment applied to a substantially planar roof of a building.
Figure 2:
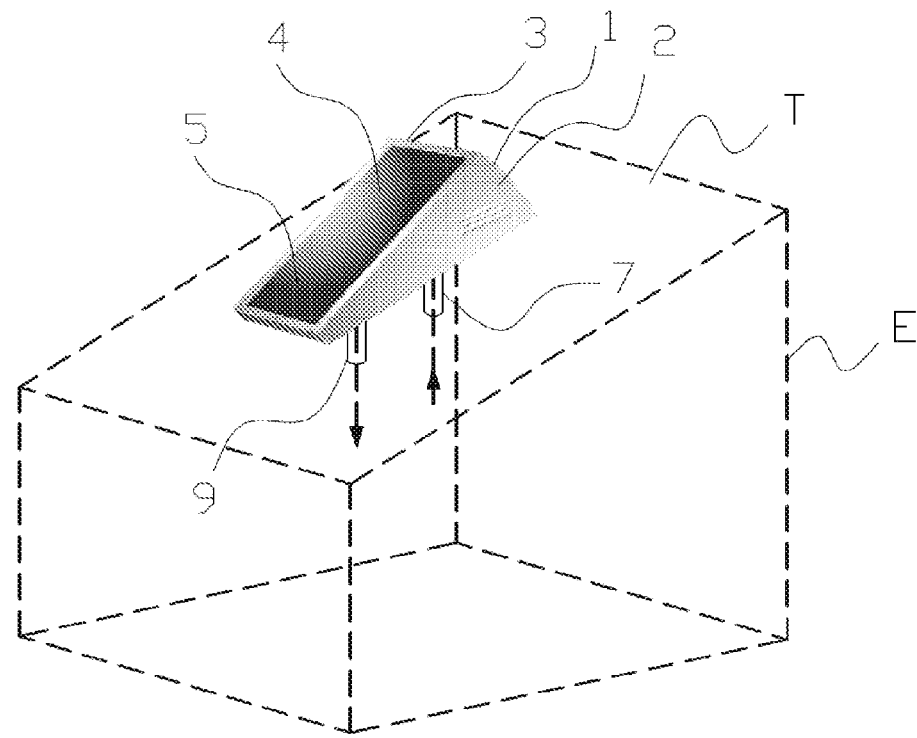
FIG. 2 is a perspective view of the device of the invention according a second embodiment applied to a substantially inclined roof of a building.

In FIGS. 1 and 2 two particular embodiments of the device according to the invention, generally designated by 1, are shown and wherein the device is installed on the roof T of a building E, simply schematized.

In both embodiments, the device is provided with a compact box-shaped casing 2 having a suitably inclined upper surface 3 associated with solar energy collector means 4, and, for non-limiting example, with a photovoltaic panel 5.

The two embodiments essentially differ therebetween in the inclination of the upper surface 3 to allow their optimal positioning on a sloping roof T.

In particular, the device can be placed either on a substantially horizontal roof T, as in the figures, or on sloped roofs. In the latter case, the upper surface 3 provided with the collector means 4, such as a solar panel or the like, may be arranged above the outer surface of the roof or integrated thereinto, substantially coplanar to the outer surface of the roof.

The casing 2 with all the related components described below may be placed close to the roof T, above or below its surface.

In a not shown embodiment, the components may also be so arranged that the entire casing 2 could be installed on a vertical wall. In this case, the upper surface 3 provided with the collector means will be smaller so as to make the device less bulky and easily to be installed even on vertical walls facing terraces or balconies.

Figure 3:
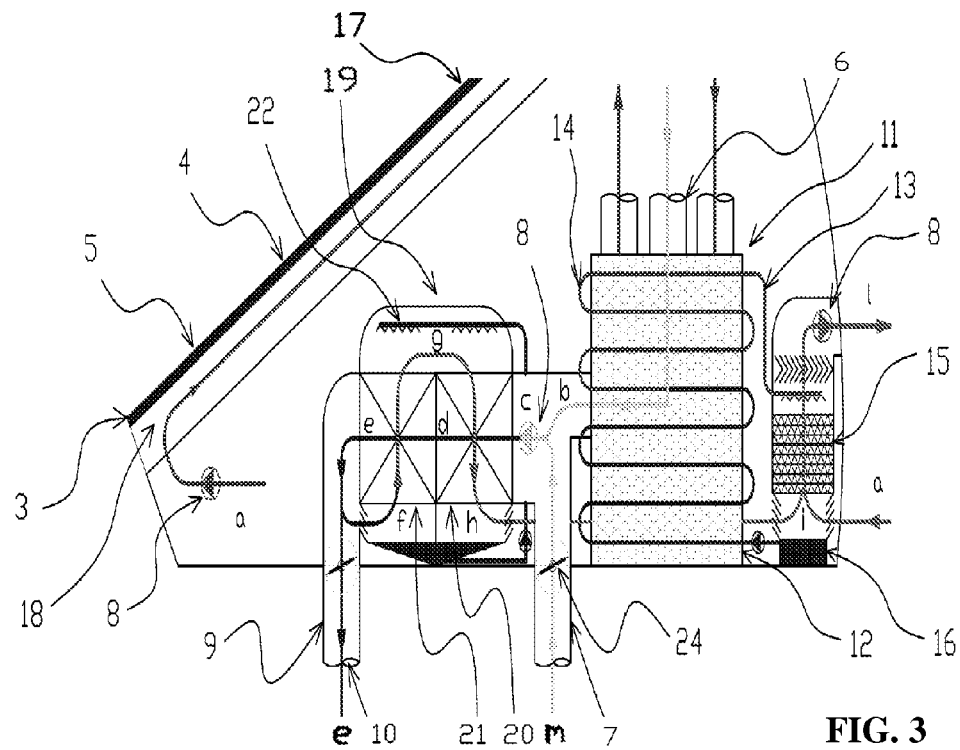
FIG. 3 is a schematic side view of the inside of a device of the invention in a first preferred embodiment.

As schematically shown in FIG. 3, the casing 2, in both the illustrated embodiments, will house thereinside a first conduit 6 for taking a first air flow rate from the outside and a second conduit 7 for taking a second air flow rate from the premise to be conditioned.

The second conduit 7 may be suitably placed in communication with the inside of the premise to be conditioned through appropriate pipes for connecting with the building E, not shown.

Both the first conduit 6 and the second conduit 7 for taking the respective flow rates will be of the known type.

Furthermore, the first and the second conduits 6, 7 will be in fluidic communication with each other, and in particular they will have a common delivery terminal section 9 for mixing the respective air flows.

The delivery section 9 will have an output 10 adapted to be placed in communication with the premise to be conditioned.

Inside the casing 2 adsorbents means 11 will also be arranged which are operatively connected with the first conduit 6 upstream of the second conduit 7 for the dehumidification of at least part of the first flow rate so that the mixing between the first and the second flow rate produces a third air flow rate adapted to define a flow of process air having a moisture lower than that of the second flow rate.

In a preferred manner the first air flow rate may be between 15% and 35% of the second flow rate.

The dehumidification step may be carried out according two preferred ways.

According to a first operation mode an isoenthalpic dehumidification may be performed through adsorbents means 11 constituted by a container 12 housing a granular adsorbent material, such as silica gel, having a properly designed geometry.

Thus, the first air flow rate will be dehumidified but simultaneously heated due to the latent condensation heat associated with the removed water vapor.

The adsorbent material will be arranged to form a bed characterized by a ratio between flow rate and passage cross-section so as to achieve high storage capability of solar energy due to its high content of silica gel in the form of adsorption capability, very long adsorption/desorption cycles (of the order of 2-5 hours), low friction loss when crossing the material (max 150 Pa).

These features allow to eliminate the traditionally known drawbacks for fixed adsorbent beds.

In a second operating mode it may be provided the simultaneous cooling of the first air flow. In this case the adsorbent means 11 may comprise a circuit 13 for the passage of a cooling fluid in thermal communication with at least part of the adsorbent material for the simultaneous cooling of the first air flow.

For example, the cooling circuit 13 may comprise a finned heat exchanging battery 14 packed with the adsorbent material and inside which water supplied from a cooling tower 15 will flow, increasing the adsorbing capacity of the material and ultimately increasing the dehumidification degree of the treated air.

At the end of the adsorption cycle, the water contained within the battery 14 will return in the drip tray 16 of the cooling tower 15, thereby eliminating the drawback concerning the presence of water in the desorption phase.

As matter of fact, if it should warm, it will deprive useful heat to the regeneration of the adsorbent material and, at the beginning of the next adsorption step, would cause a release of heat in the circuit of the cooling tower 15, resulting in energy loss.

The use of the cooling tower 15, however, is not intended to be necessary to the operation and in a simplified version of the device 1, not shown, it could be not provided in order to have in turn two uncooled adsorbent beds essentially composed of two containers filled with the adsorbent material.

In addition to the flow of process air inside the casing 2 it will be also provided the passage of a further air flow for regeneration of the adsorbent material.

In particular, heating means 17 will be provided which are suitable to send to the adsorbent means 11 a fourth air flow rate heated to a temperature greater than the environment temperature to promote the desorption of the adsorbent material and the subsequent regeneration of the adsorbent means 11.

The fourth air flow rate, which may be between 20% and 50% of the second air flow rate, will be taken from the outside or from any other environment through respective circulation means 8.

Advantageously, the adsorbent means 11 comprise at least one first and one second portion 11', 11" adapted to be invested selectively and alternately from the first and fourth air flow rate.

For example the above container 12 may house two separate beds of adsorbent material adapted to be alternately crossed by the first and fourth air flow rate.

This will ensure continuity in the service of dehumidification of the adsorbent means 11 as the two distinct portions 11', 11" are alternately affected by a process of adsorption and desorption.

Figure 4:
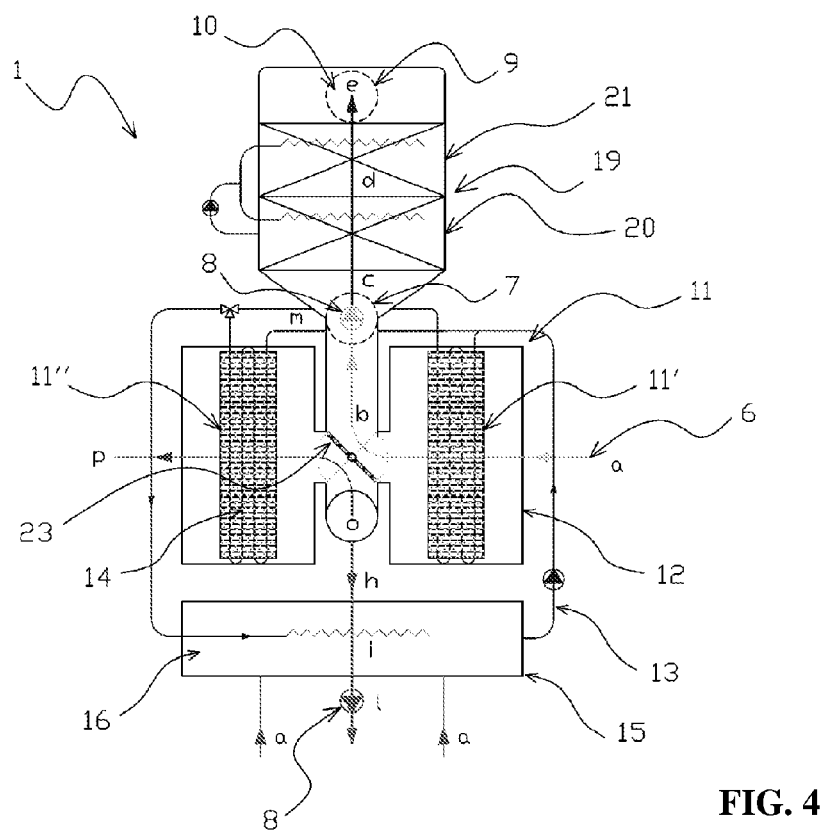
FIG. 4 is an elevated view of the inside of a device of the invention in a first preferred embodiment.

To this end valve means 23, shown in FIG. 4, will be suitably provided, which valve means 23 will be adapted to selectively and automatically divert the flow of the first and fourth air flow rate between the two beds of adsorbent material.

For example the valve means 23 may comprise an automatic control device adapted to actuate a four-way diverter valve in function of the conditions of the regeneration air and of the degree of saturation of the adsorbent bed.

The presence of the adsorbent means 11 will also ensure effective filtration of process air delivered into the premise. As matter of fact, any harmful substances in the outside air may be adsorbed into the material during the adsorption step and released to the atmosphere during the desorption step.

The fourth air flow rate will flow in a duct 18 housed in the casing 2 and associated with the collector means 4, associated to the outer wall 3 of the housing 2 and optionally provided with the aforementioned photovoltaic panel 5.

Suitably, heat exchange means 19 will be provided at the delivery section 9 and will be adapted to perform the cooling of the third air flow rate.

Preferably, the heat exchange means 19 will comprise a first and a second evaporative heat exchanger of static pack type, respectively referred 20 and 21, for the progressive cooling of the third air flow rate.

The heat exchangers 20, 21 will have respective primary circuits and respective secondary circuits, the latter being in fluid communication and in series therebetween.

The delivery section 9 will be connected to the secondary circuit of the second heat exchanger 21 to deflect in the same a part of the third flow rate substantially close to the first flow rate so that the conditioned air flow delivered to the premises to be conditioned could have a flow rate substantially equal to the second flow rate. i.e. to that of the air flow taken from the same premise. This adjustment may be implemented by means of suitable valve means 24.

The second heat exchanger 21 will preferably be associated with a nebulizer device 22 adapted to introduce water in its secondary circuit for saturating the circulating fluid and promoting the cooling of the fluid evolving in the primary circuits of the heat exchangers 20, 21.

The secondary air flow will pass through the finned pack of the secondary circuit of the second heat exchanger 21 to be brought substantially in conditions of saturation, and at the output of this circuit it will come back within the finned pack of the secondary circuit of the first evaporative heat exchanger 20.

Below is an example table of typical values for the above air flow rates at sensitive points of the device 1 described above in a typical cooling cycle.

Figure 5:
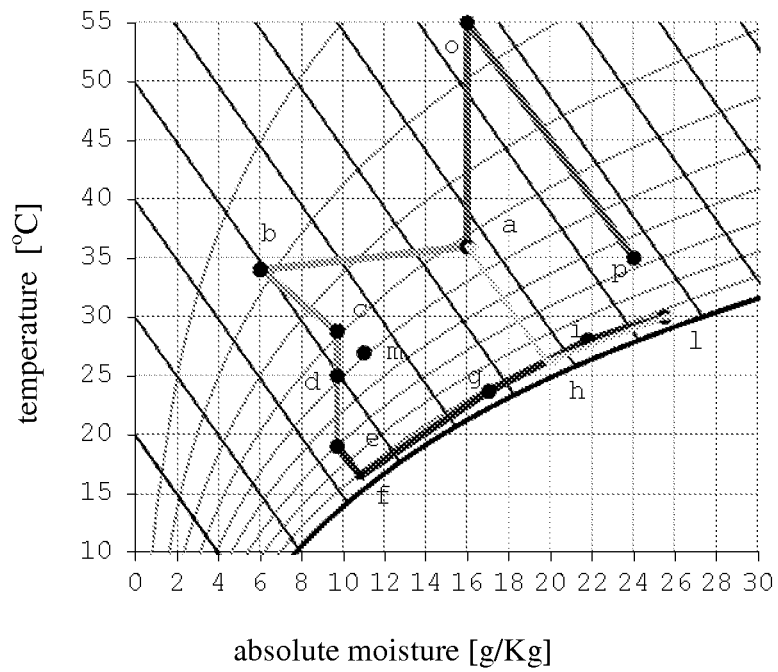
FIG. 5 is a moisture/temperature diagram of the device of FIG. 3 in cooling/dehumidifying mode.

In this table the letters of the last column at the right refer to the points indicated in the diagram of FIG. 5.

| x g/kg | T °C. | h kJ/kg | Description | — |
|---|---|---|---|---|
| 16 | 36.0 | 77.2 | Outside air | a |
| 6.0 | 34.0 | 49.5 | Adsorbing and cooling | b |
| 9.7 | 28.8 | 53.7 | Mixing | c |
| 9.7 | 25.0 | 49.8 | HX evap 1 | d |
| 9.7 | 19 | 43.7 | HX evap 2 | e |
| 11.0 | 27.0 | 55.2 | Back from the building | m |
| 9.7 | 19.0 | 43.7 | Spillage | e |
| 10.8 | 16.5 | 43.9 | Humidification | f |
| 17 | 23.7 | 67.1 | HX evap 2 | g |
| 21.8 | 28 | 83.8 | HX evap 1 | i |
| 25.5 | 30.0 | 95.3 | Humidification | h |
| 16 | 36.0 | 77.2 | Outside air | a |
| 19.8 | 26.2 | 76.8 | Tower | h |
| 25.5 | 30.0 | 95.3 | Tower outlet | l |
| 16.0 | 36.0 | 77.2 | Outside air | a |
| 16.0 | 55.0 | 96.9 | Solar | o |
| 24.0 | 35.0 | 96.7 | Desorption | p |

For the estimation of the energy performance of the device in the cooling mode, reference was made to the following design conditions:
$T_{outside}=36°$ C., $x_{outside}=16$ gr/kg
$T_{inside}=27°$ C.; $x_{inside}=11$ gr/kg
Total solar radiation on the plane of the collector 4 equal to 900 W/m$^2$.

The total air flow rate considered in this example is 500 m3/h. The cooling power of the device 1 provided in the environment in these conditions is about 2 kW, about the 30% thereof being due to the treatment of the latent load. The total cooling power provided by the device, also considering the treatment of the external air, is approximately 6 kW and the attended electrical COP of the whole device is greater than 15. The water consumption is about 6 l/h at maximum power.

The entire conditioning cycle is based on the fact that it will be possible to efficiently cool the primary air flow even using a low flow rate on the secondary. This allows to limit the outside air flow rate treated by the adsorbent bed with the advantages described above and to maximize the cooling power of the cycle.

Figure 6:
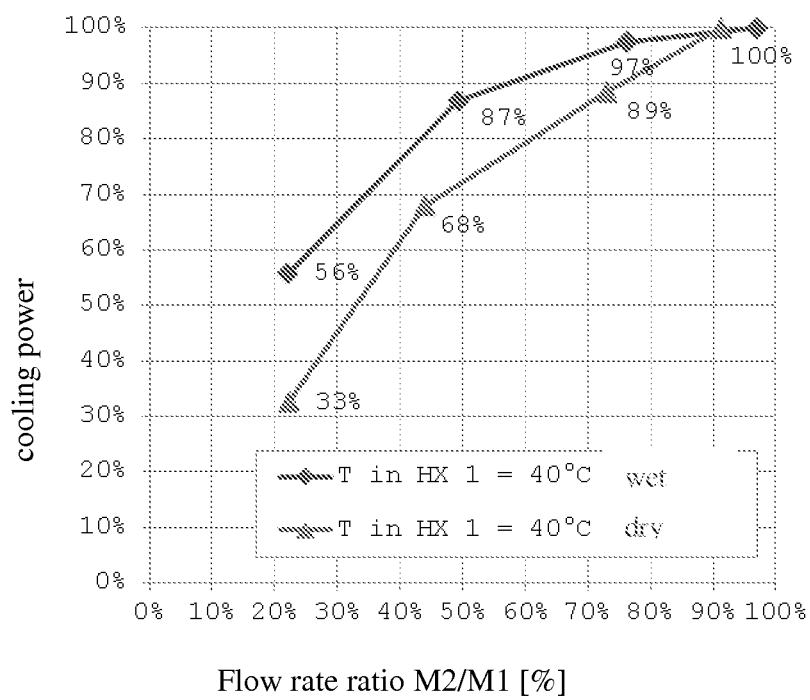
FIG. 6 is a diagram showing the path of the heat exchanging efficiency as function of the flow rate during operating in dry condition and in wet condition.

As shown in the diagram of FIG. 6, during wet operation the pack heat exchanger has a heat exchange efficiencies of the order of 60-65% with flow rates of the secondary circuit equal to 25-30% of those of the primary circuit.

The two consecutive cooling stages allow to reach exit temperature of the primary circuit next to the wet bulb temperature of the point e.

The device 1 may also be used in winter operation, i.e. for the heating and/or dehumidification of the delivered air.

In this case a first air flow rate is taken from the outside and is delivered in the premise to be conditioned after its heating operated by the collector means 4 and possibly after its even partially dehumidification by passage through the adsorbent means 11. This can be achieved by suitably positioning the valve means 23.

Simultaneously an equal air flow rate may be taken from the premise and expelled at the outside so as to ensure the necessary air change.

The above device 1 may be provided with additional accessories, not shown, such as a conventional heat pump integrated in the cycle, to be used if necessary as auxiliary system on days with low solar radiation and/or particularly high refrigeration load, interfaces for modular connection with additional devices, photovoltaic panel, accessories for modularity (position of connections, fan, channels, control).

From the above description, it is clear that the device allows to obtain several advantages. In particular, in addition to a particular compactness, the device will have reduced electrical consumption, solely related to the drive of three fans, two water recirculation pumps and other small electric actuators with reduced power.

The device may also be easily installed in a plug-n-play mode by means of two air channels with reduced diameter (about 10-12 cm), the connection to the water network and to the low power electricity network. The device may be fitted with the necessary accessories for use even in areas not served by electrical net.

The device may also be used only as a air dehumidifier and/or to make the simple exchange of air in the intermediate seasons. The adsorbent bed having a high quantity of material will allow to accumulate dehumidification capacity when high solar radiation is available and to use it at a later time. This allows to ensure a continuity of service even in absence of radiation for a period of time of the order of several hours.

However, the device and the method according to the invention may present several changes compared to those disclosed, all coming within the scope of protection defined by the appended claims.

The invention claimed is:

1. A device for air conditioning a premise, which device comprises:
    a casing (2) configured to be installed outside of a premise to be conditioned and house therein:
    a first conduit (6) for taking a first air flow rate from outside;
    a second conduit (7) for taking a second air flow rate from the premise to be conditioned, said second conduit (7) being in fluidic communication with said first conduit (6) for mixing the respective flow rates;
    an adsorption unit (11) operatively connected with said first conduit (6) upstream of said second conduit (7) for at least partial dehumidification of said first air flow rate, said first (6) and second conduits (7) having a common delivery section (9) configured to deliver a third air flow rate to the premise to be conditioned; and
    a heating system (17) configured to deliver a fourth air flow rate to said adsorption unit (11) at a higher temperature than an outside temperature for regeneration thereof;
    wherein said adsorption unit (11) comprises at least one first (11') and one second portion (11") adapted to be selectively and alternately crossed by said first and said fourth air flow rates.

2. The device as claimed in claim 1, wherein said heating system (17) comprises a third conduit (18) housed into said casing (2) for taking said fourth air flow rate, and a solar energy collector (4) associated with an outer wall (3) of said casing (2) for heating said fourth air flow rate up to a regeneration temperature.

3. The device as claimed in claim 1, wherein said adsorption unit (11) comprises a container (12) housing a predetermined amount of a granular adsorption material, said container (12) being divided in said first (11') and said second portion (11") and being configured to be crossed by said first and said fourth air flow rates.

4. The device as claimed in claim 3, wherein said adsorption unit (11) comprises a cooling circuit (13) in thermal communication with said adsorption unit (11) for passage of a cooling fluid to simultaneously cool said first air flow rate.

5. The device as claimed in claim 3, further comprising a valve (23) that selectively and automatically deviates flows of said first and fourth air flow rates into said first (11') or into said second portion (11") of said adsorption unit (11).

6. The device as claimed in claim 5, further comprising a heat exchanger (19) associated with said common delivery section (9) for cooling said third air flow rate.

7. The device as claimed in claim 6, wherein said heat exchanger (19) comprises a first (20) and a second packaged wet stationary heat exchanger (21) having respective secondary circuits for the progressively cooling said third air flow rate, said heat exchangers (20, 21) having respective primary circuits and respective secondary circuits, these latter being in fluidic connection with each other.

8. The device as claimed in claim 7, wherein said delivery section (9) is connected with the secondary circuit of said second heat exchanger (21) for diverting thereinto a part of said third air flow rate substantially equal to said first air flow rate, a nebulizing device (22) being further provided which is adapted to supply water into the secondary circuit of said second heat exchanger (21) for saturating a fluid flowing thereinto and promoting a cooling of a fluid operating into the primary circuits of said heat exchangers (20, 21).

9. A method for air conditioning an inside of a premise comprising the following steps:
   a) taking a first air flow rate from outside and making said first air flow rate pass through an adsorption material for at least partially dehumidifying said first air flow rate;
   b) taking a second air flow rate from the premise to be conditioned, c) mixing said first and second air flow rates for delivering a conditioned third air flow into the premise to be conditioned; and
   d) at least partially regenerating said adsorption material through passage of a fourth air flow rate heated at temperature higher than an outside temperature;
   wherein said steps of dehumidifying and regenerating are carried out by alternating a passage of said first and fourth air flow rates through a first and a second portion of said adsorption material.

10. The method as claimed in claim 9, further comprising a cooling step of said third air flow rate by its passage through a wet heat exchanger.

* * * * *